United States Patent [19]

Büttner

[11] Patent Number: 4,946,190

[45] Date of Patent: Aug. 7, 1990

[54] SUSPENSION FOR THE VEHICLE WHEEL AXLE

[75] Inventor: Josef Büttner, Waldaschaff, Fed. Rep. of Germany

[73] Assignee: Otto Sauer, Achsenfabrik Keilberg, Bessenbach-Keilberg, Fed. Rep. of Germany

[21] Appl. No.: 240,613

[22] Filed: Sep. 6, 1988

[30] Foreign Application Priority Data

Sep. 5, 1987 [DE] Fed. Rep. of Germany ....... 3729792

[51] Int. Cl.⁵ ............................................... B60G 9/02
[52] U.S. Cl. ..................................... 280/712; 280/718
[58] Field of Search ................................ 280/712, 718

[56] References Cited

U.S. PATENT DOCUMENTS 3,233,915  2/1966  Hamlet ............................... 280/712
3,802,718  4/1974  Schaeff .............................. 280/712
3,850,445  11/1974  Borns et al. ......................... 280/712

FOREIGN PATENT DOCUMENTS 2100048  7/1972  Fed. Rep. of Germany .
2224315  11/1973  Fed. Rep. of Germany .
2306392  8/1974  Fed. Rep. of Germany ...... 280/712
3148015  6/1983  Fed. Rep. of Germany .
2529838  1/1984  France .
1506849  8/1975  United Kingdom .

Primary Examiner—Kenneth R. Rice
Attorney, Agent, or Firm—Wenderoth, Lind & Ponack

[57] ABSTRACT

The invention relates to a suspension for a vehicle wheel axle having a rigid axle member with at least one upper guide leaf and at least one bottom bearing leaf each on both sides of longitudinal median plane of the vehicle. They form a parabolic guide at their front ends they are articulated at a bearing point of the chassis and between their front and rear ends they are clamped rigidly to the axle member, the rear end of the guide leaf can be moved longitudinally on the chassis a bearing arm of the bearing leaf, projecting rearwards from the the axle member, forms a bottom bearing of an air spring on whose upper end the chassis is supported. To improve the properties of such an axle suspension the bearing point is approximately level to the axle member and the guide leaf extends primarily sloped from the front bottom towards the rear top.

19 Claims, 4 Drawing Sheets

SUSPENSION FOR THE VEHICLE WHEEL AXLE

BACKGROUND OF THE INVENTION

The invention relates to a suspension for a vehicle wheel axle having a rigid axle member, in particular a driving axle, with at least one upper guide leaf and at least one bottom bearing leaf, each on both sides of the longitudinal median plane of the vehicle, which together form a parabolic guide. At their front ends they are articulated at a preferably common bearing point, formed e.g. by a bearing bolt perpendicular to the longitudinal median plane of the vehicle of the chassis. Between their front and rear ends they are clamped rigidly to the axle member, preferably above the axle member. The rear end of the guide leaf can be moved longitudinally on the chassis, and a bearing arm of the bearing leaf, projecting rearwards from the the axle member, forms a bottom bearing of an air spring on whose upper end the chassis is supported.

Such an axle suspension is known for example, from FIG. 2 of DE-PS No. 21 00 048. In this case the bearing bolt for the reception of the front ends of the guide leaf and the bearing leaf is mounted on the chassis at a considerable distance above the axle member. The guide leaf extends essentially horizontally and has, over its entire length, a constant cross-section. The front section of the bearing leaf is designed as a parabolic spring, whereas a separate bearing arm with an extension projects over the axle member towards the front and together with the rear end of the bearing leaf and of the guide leaf are clamped together with a stirrup above the axle member. Of course, such a suspension has withstood the test, but since the guide leaf can bend, it has a limited spring deflection of about 180 mm, measured at the axle member. Furthermore, the axle member pivots in a circular arc around the front spring bearing point. Thus with unilateral compression, the axle develops bump steering behavior. Also, in the case of a driving axle during compression, the Cardan shaft angle between the front and rear joint changes, which is undesirable. Furthermore, the sliding part of the Cardan shaft can shift; such movements can result in increased wear. Also, the length of the known driving axle air spring extension is relatively large, which is in particular, an impediment for semi-trailer tractors. Since the front spring bearing point of the guide leaf and bearing leaf lies relatively high above the axle member, there is an unhinging effect during rearward braking.

SUMMARY OF THE INVENTION

Starting from the above background, the object of the invention is to provide a suspension for a vehicle wheel axle of the generic kind, which exhibits better kinematics, requires less space and on the whole is easier to construct.

The invention solves the problem essentially by having the bearing point level with the axle member e.g. level with the axle center of the axle member, and having the guide leaf slopes primarily from the bottom front to the top rear. Such an arrangement offers several simultaneous advantages. Due to the lower mounting arrangement of the bearing point, the suspension no longer has bump steering behavior. Since the guide leaf slopes essentially from the front bottom to the rear top, while the length of the guide leaf remains constant, the length of the suspension becomes shorter.

The bellows of the air spring exhibits better kinematics (better rolling properties), and more clearance space below the bellows of the air spring is gained, since the mounting can be at a higher point.

The entire thrust of the suspension increases if the flexural stress of the guide leaf is constant, for example up to 50 mm. Only a frame cross member is necessary for the bellows of the air springs and for the rear spring bearing. During rearwards braking there is no lifting of the vehicle and the guide leaf can be more readily designed than previously. Since the front bearing point of the guide leaf and the bearing leaf lies approximately level with the axle center, and thus level with the Cardan shaft, the sliding path of the Cardan shaft is reduced.

According to a further feature of the present invention, the guide leaf is braced with the axle member, separately from the bearing leaf, by means of preferably a plate-shaped clamping element in front of the axle member. Since the clamping of the guide leaf is displaced forward with respect to the actual clamping of the axle, while the length of the guide leaf remains constant, the suspension becomes shorter. Thus for example, without more effort, a space of about 300 mm is less required rearwards, while the bending length remains constant. The bending length of the arm of the guide leaf, which is behind the clamping of the guide leaf, increases and the bending tension decreases. The clamping of the guide leaf, which is separated from the bearing leaf, permits the use of a guide leaf having a width of, for example, 100 mm with a 90 mm wide axle clamping. The intermediate support for the clamping of the axle member at the bearing leaf and the rear part of the clamping element can be designed correspondingly smaller and lighter and, for example, as an axle tongue.

The rear part of both the clamping element and the bearing leaf are clamped in a simple manner with the axle member by means of a stirrup.

The entire length of the arm of the guide leaf, which is in front of the clamping of the guide leaf, has essentially a constant cross-section. If the clamping of the guide leaf of the invention is displaced in front of the axle member, this arm is subject to less bending stress, if shear and traction forces are transferred.

Furthermore, the arm of the guide leaf that is behind the clamping of the guide leaf is preferably designed as a parabolic spring.

Various embodiments exist for the sloped position of the guide leaf. Whereas a guide leaf with a constant sloped position can run from the front bearing point to the rear mounting, under some circumstances it is expedient if the front arm of the guide leaf is somewhat more tilted than the rear arm of the guide leaf in order to improve the compression properties.

The spring leaf can be slightly bent over a portion of its length, and, in particular as seen from the axle member, can be concave.

In another advantageous embodiment of the invention, at least the front-most section of the guide leaf runs parallel to the front arm of the bearing leaf, whereby the end sections are moved slightly from the guide leaf and the bearing leaf in the spring eye at the bearing point, and thus there is some wear. For this purpose, at least the front-most section of the guide leaf can abut the bearing leaf.

It is even more advantageous if a significant portion of the length of the front arm of the guide leaf runs parallel to the front arm of the bearing leaf.

Furthermore, in another embodiment of the present invention it is possible that the front arm of the guide leaf rises at an angle from the front rearward, and the rear arm of the guide leaf runs partically horizontally. Thus it is possible to reduce the length and gain a more favorable altitude for the air spring by tilting the front arm of the guide leaf.

The guide leaf can also be clamped at an intermediate section of its length, which slopes more steeply from the front towards the back than the front arm and/or the rear arm of the guide leaf, so that even if the rear arm of the guide leaf runs essentially horizontally, the rear end of the guide leaf is at relative to the axle member, the required altitude.

In the known axle suspension, the center, intermediate, section of the bearing leaf, which serves for clamping, is already essentially horizonal, and the rear bearing arm of the bearing leaf is somewhat S-shaped at the bottom, rearwards from its clamping position. Within the framework of the present invention, it is also proposed that the front arm of the bearing leaf be sloped from the front towards the back. Thus, while retaining the desired oblique position of the guide leaf, the entire construction height of the suspension is reduced to the extent desired.

The front arm of the bearing leaf can be designed as a parabolic spring.

Another feature of the invention is that the clamping element for guide leaf may have a joint with an articulated axle which runs vertically to the central longitudinal plane of the vehicle. Thus, while the bending tension of the guide leaf is constant, the spring path is increased still further.

The front ends of the guide leaf and the bearing leaf are preferably tightly rolled up against one another, i.e. the inner diameter of the spring eye of the bearing leaf is equal to the outer diameter of the spring eye of the guide leaf in order to transfer the longitudinal guide of the axle from the guide leaf to the bearing leaf.

BRIEF DESCRIPTION OF THE DRAWINGS

Other goals, features, advantages and application possibilities of the present invention result from the following description of the embodiments with the aid of the accompanying drawings. In which.

DETAILED DESCRIPTION OF THE PREFERRED EMBODIMENTS

Figure 1:
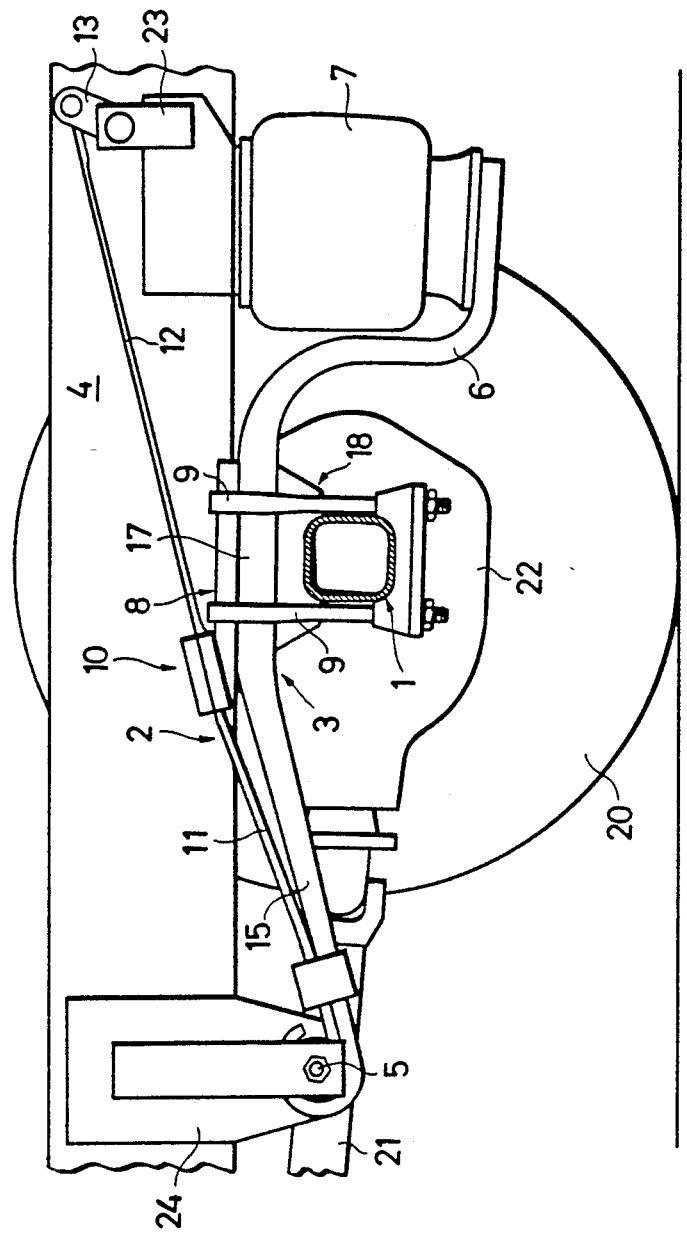
FIG. 1 is a schematic side view of a first embodiment of a suspension for a vehicle wheel axle according to the present invention.

A suspension of the axle, according to FIG. 1 is entended for a driving axle having an axle member 1, designed as a suspension tube, which bears wheels 20. The wheels 20 are driven by a Cardan shaft 21 by means of a drive 22. On both sides of the longitudinal median plane of the vehicle, the suspension has an upper guide leaf 2 and a bottom bearing leaf 3. Guide leaf 2 and bearing leaf 3 together form a parabolic guide. At their front ends guide leaf 2 and bearing leaf 3 are articulated on a common bearing point 5 of a chassis 4, formed by a bearing bolt that is mounted to the chassis 4 perpendicular to the longitudinal median plane of the vehicle. Both the guide leaf 2 and the bearing leaf 3 extend rearwards over the axle member 1. Between their respective front and rear ends, not only the guide leaf 2, but also the bearing leaf 3 is clamped rigidly together with the axle member 1. Particularly, the bearing leaf 3, with a central, essentially horizontal intermediate section 17, via stirrup 9 directly clamps with the axle member 1 at a clamping portion 18. By means of the stirrup 9, the rear portion of a clamping element 8 is also included in the clamping 18, which clamping portion element 8 is provided to create a separate clamping portion 10 of the guide leaf 2. The front bearing point 5 is approximately level with the axle member 1, particularly the center axis of the axle. The rear end of the guide leaf 2 can be moved longitudinally by means of a leg (13) that can be rotated with respect to the chassis 4. The mounting lies at such a distance above the axle member 1 that the guide leaf 2 extends, on the whole sloped primarily from the front bottom towards the top rear. At the same time the front arm 11 of the guide leaf 2, which lies before the clamping potion 10, has a somewhat steeper slope than the rear arm 12 of the guide leaf 2, which lies behind the clamping portion 10. A bearing arm 6 of the bearing leaf 3, which projects rearwards from the axle member 1, forms the bottom bearing of an air spring 7 on whose upper end the chassis 4 is supported. The front arm 15 of the bearing leaf 3, which lies in front of the clamping portion 18, also slopes to the rear top from the front bearing point 5, but is somewhat flatter than the front arm 11 of the guide leaf 2. The front arm 11 of the guide leaf 2 has over its entire length a constant cross-section. The rear arm 12 of the guide leaf 2 is designed as a parabolic spring. The rear bearing arm 6 of the bearing leaf 3 is somewhat S-shaped rearwards, at the bottom, from its clamping portion 18. The front arm 15 of the bearing leaf 3 is designed as a parabolic spring.

The difference between the embodiment of FIG. 2 and that illustrated in FIG. 1 lies primarily in the following features: the guide leaf 2 is first of all slightly bent particularly in the region of its front arm 11, and, in particular from the perspective of the axle member 1, is concave. The front-most section of the front arm 11 of the guide leaf 2 is truncated towards the bottom and thus runs parallel directly abutting the front section of the front arm 15 of the bearing arm 3. The rear end of the guide leaf 2 is received in a sliding shoe 14, which is held at a rear bearing support 23, in the same manner as the leg 13 in FIG. 1.

Figure 2:
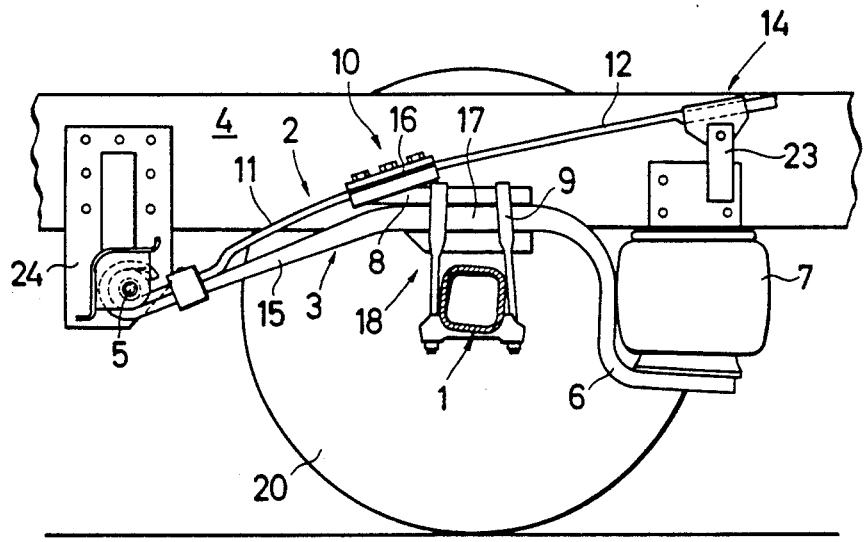
FIG. 2 is a schematic side view of a second embodiment of a suspension for a vehicle wheel axle according to the present invention.
Figure 3:
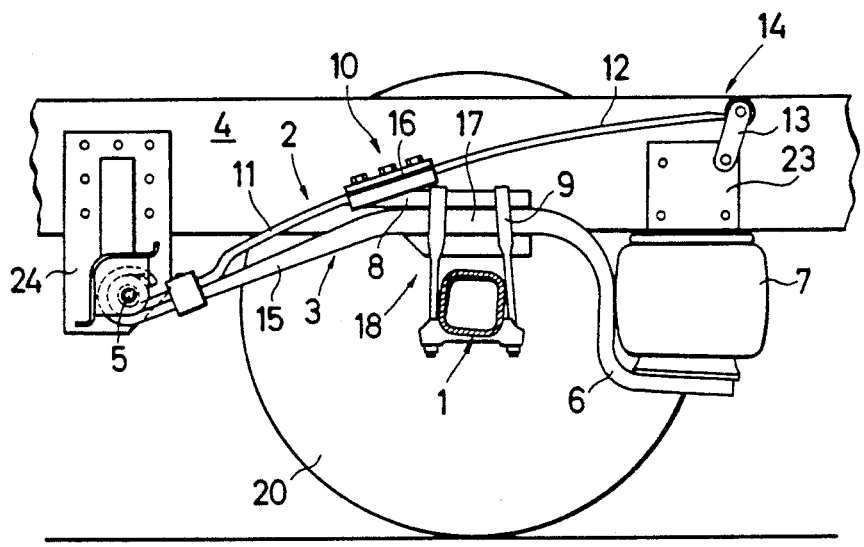
FIG. 3 is a schematic side view of a third embodiment of a suspension for a vehicle wheel axle according to the present invention.

The only difference between the embodiment of FIG. 3 and that of FIG. 2 is primarily that the rear end of the guide leaf 2 is articulated at the rotatable leg 13.

Figure 4:
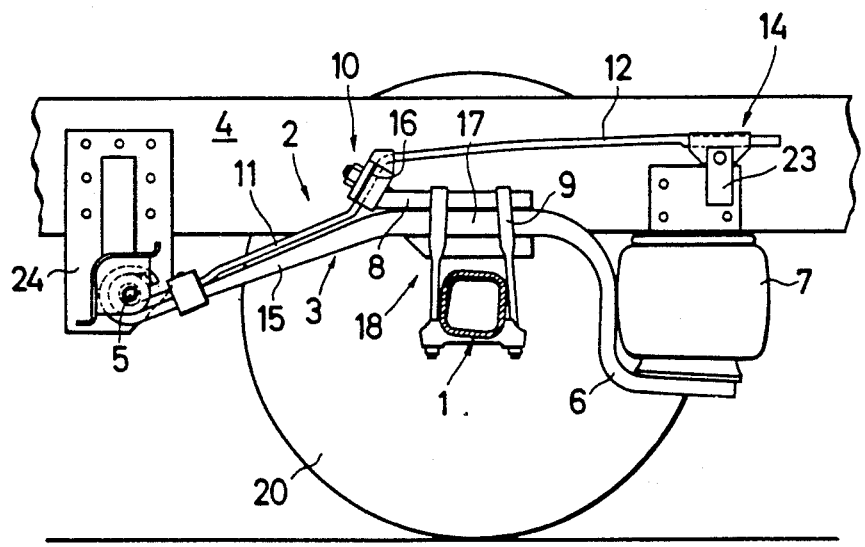
FIG. 4 is a schematic side view of a fourth embodiment of a suspension for a vehicle wheel axle according to the present invention.

In the embodiment of FIG. 4 the entire front arm 11 of the guide leaf 2 runs primarily parallel to the front arm 15 of the bearing leaf 3, wherein again the front-most section of the front arm 11 abuts the front-most section of the front arm 15. The clamping portion 10 of the guide leaf 2 is at an intermediate section 16, which is steeper from the front bottom towards the rear at the top than the front arm 11 of the guide leaf 2. The rear arm 12 of the guide leaf, which is connected to the intermediate section 16, extends primarily horizontally or with a slight concave curvature in which increases only slightly until a sliding shoe 14 receives its rear end.

Figure 5:
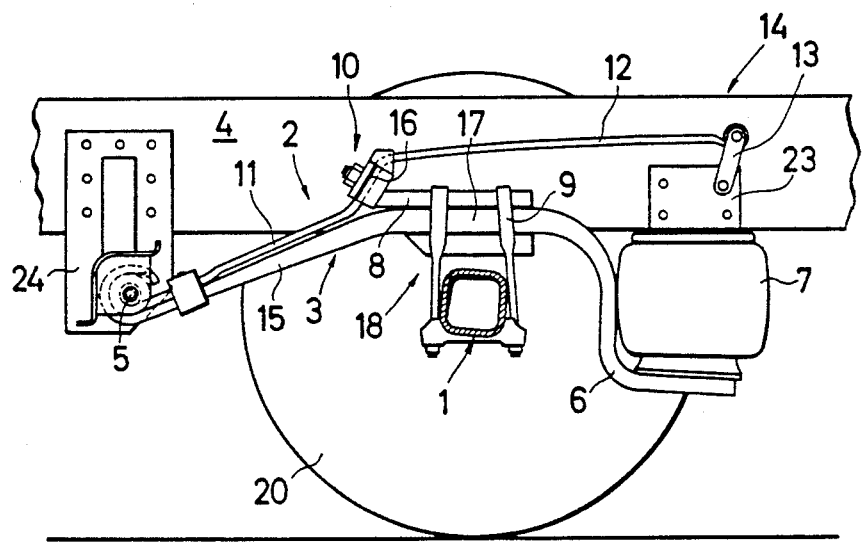
FIG. 5 is a schematic side view of a fifth embodiment of a suspension for a vehicle wheel axle according to the present invention.

The embodiment of FIG. 5 corresponds essentially to that of FIG. 4 except that here the rear end of the guide leaf 2 is articulated at the rotatable leg 13.

Figure 6:
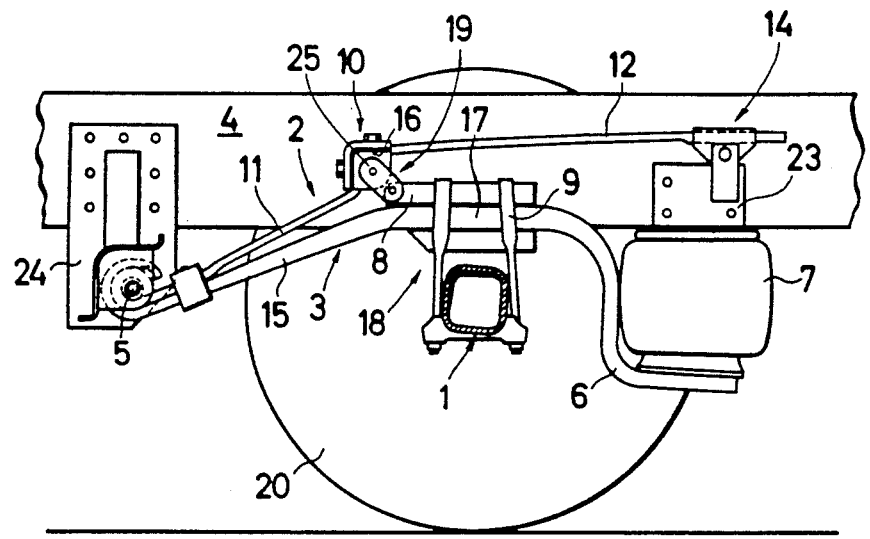
FIG. 6 is a schematic side veiw of a sixth embodiment of a suspension for a vehicle wheel axle according to the present invention.

The special feature of the embodiment of FIG. 6 is that the clamping element 8 comprises a front part and a rear part, which are connected by means of an articulated link 25. The rear, primarily plate-shaped portion of the clamping element 8 is combined with the stirrup 9 and the intermediate section 17 of the bearing leaf 3 and the axle body 1 in the clamping 18. The front part of the clamping portion element 8 receives the intermediate section 16 of the guide leaf 2, which in this case is bent. The front arm 11 also extends at an angle towards the front arm 15 of the bearing leaf 3, which is also the case in FIG. 1; the front-most section of the front arm 11, however, extends parallel to and abutting the front-most section of the front arm 15 of the bearing plate 3. The rear arm 12 of the guide leaf 2 extends again, primarily horizontally or slopes only slightly and ends with its rear end in a sliding shoe 14. The front ends of the guide leaf 2 and bearing leaf 3 are tightly rolled up abutting one another in their front spring eye and are pierced by a bearing bolt, forming the bearing point 5, said bolt being mounted to a front bearing support 24.

I claim:

1. A suspension for a vehicle wheel axis on a vehicle chassis having a rigid axle member, comprising:
   at least one upper guide leaf having a front end;
   a bearing point on the vehicle chassis, wherein said front end of said upper guide is articulated at said bearing point;
   at least one bottom bearing leaf having a front arm articulated at said bearing point;
   clamping means for clamping said upper guide leaf and for clamping said bottom bearing leaf at midpoints thereof to the rigid axle member;
   means for mounting the rear end of said upper guide leaf to the vehicle chassis such that said rear end can move longitudinally relative to the chassis; and
   a bearing arm on said at least one bottom bearing leaf projecting rearwards from the rigid axle member, said bearing arm comprising a bottom bearing for supporting an air spring for supporting the vehicle chassis;
   wherein said bearing point, relative to a horizontal plane, is substantially level with said rigid axle member, said upper guide leaf is sloped upwardly as it extends rearwardly from said bearing joint, and said front arm of said bottom bearing leaf is sloped upwardly as it extends rearwardly from said bearing point.

2. The suspension as set forth in claim 1, wherein said clamping means comprises a plate-shaped clamping element connected to said upper guide leaf at its said midpoint at a position forward of said axle member.

3. The suspension as set forth in claim 2, wherein said clamping means further comprises a clamp for clamping the rear portion of said plate-shaped clamping element and said bottom bearing leaf together with the rigid axle member.

4. The suspension as set forth in claim 1, wherein said upper guide leaf has a front arm portion thereof extendingly forwardly of said midpoint of said upper guide leaf, said front arm portion of said upper guide leaf having a substantially constant cross-section over its length.

5. The suspension as set forth in claim 1, wherein the portion of said upper guide leaf rearward of said midpoint of said upper guide leaf is a parabolic spring.

6. The suspension as set forth in claim 1 wherein said means for mounting the rear end of said upper guide leaf to the vehicle chassis such that said rear end can move longitudinally relative to the chassis comprises a rotatable leg member to which said rear end is connected, said rotatable leg member being rotatably mountable on the vehicle chassis.

7. The suspension as set forth in claim 1 wherein said means for mounting the rear end of said upper guide leaf to the vehicle chassis such that said rear end can move longitudinally relative to the chassis comprises a sliding shoe member for slidingly receiving said rear end of said upper guide leaf.

8. The suspension as set forth in claim 1, wherein said upper guide leaf, sloped upwardly as it extends rearwardly from said bearing point, is sloped upward to a greater degree than said front arm of said bottom bearing leaf.

9. The suspension as set forth in claim 1, wherein said upper guide leaf is slightly curved over at least one portion thereof and is concave relative to the rigid axle member.

10. The suspension as set forth in claim 1, wherein at least a section of said upper guide leaf at its front end extends parallel to said front arm of said bottom bearing leaf.

11. The suspension as set forth in claim 1, wherein at least a section of said upper guide leaf at its front end abuts said bearing leaf.

12. The suspension as set forth in claim 1, wherein a substantial portion of said upper guide leaf between its front end and its said midpoint extends parallel to said front arm of said bottom bearing leaf.

13. The suspension as set forth in claim 1, wherein said upper guide leaf between its said front end and its said midpoint slopes upwardly as its extends rearwardly and said upper guide leaf between said midpoint and said rear end of said upper guide leaf extends substantially horizontally.

14. The suspension as set forth in claim 1, wherein said upper guide leaf comprises an intermediate section, said intermediate section including said midpoint whereat said upper guide leaf is clamped to the rigid axle member, and said intermediate section extending rearwardly with an upward slope greater in degree than the rearward upward slope of said upper guide leaf between said intermediate section and said front end of said upper guide leaf and between said intermediate section and said rear end of said upper guide leaf.

15. The suspension as set forth in claim 1, wherein said bottom bearing leaf comprises a substantially horizontally extending central intermediate section, said central intermediate section including said midpoint whereat said bottom bearing leaf is clamped to the rigid axle member, said bottom bearing arm of said bottom bearing leaf extends in an S-shape, substantially, from said central intermediate section, and said front arm of said bottom bearing leaf slopes upwardly from said bearing point to said central intermediate section.

16. The suspension as set forth in claim 1, wherein said front arm of said upper bearing leaf is a parabolic spring.

17. The suspension as set forth in claim 1, wherein said clamping means comprises a clamping member and a link articulated on said clamping member, said link being connected to said upper guide leaf at its said midpoint.

18. The suspension as set forth in claim 1, wherein said front end of said upper guide leaf and the front end of said front arm of said bottom bearing leaf are rolled together and abutting one another at said bearing point.

19. A suspension for a vehicle wheel axle on a vehicle chassis having a rigid axle member, comprising:

at least one upper guide leaf having a front end;

a bearing point on the vehicle chassis, wherein said front end of said upper guide leaf is articulated at said bearing point;

at least one bottom bearing leaf having a front arm articulated at said bearing point;

means for mounting the rear end of said upper guide leaf to the vehicle chassis such that said rear end can move longitudinally relative to the chassis;

a bearing arm on said at least one bottom bearing leaf projecting rearwards from the rigid axle member, said bearing arm comprising a bottom bearing for supporting an air spring for supporting the vehicle chassis; and a clamping arrangement for clamping said upper guide leaf and said bottom bearing leaf at midpoints thereof to the rigid axle member, said clamping arrangement comprising a clamping element connected to said upper guide leaf and a clamp clamping said clamping element and said bottom bearing leaf to the rigid axle member, wherein said clamping element is connnected to said upper leaf guide at a position substantially forward of said rigid axle member in the direction of said bearing point.

* * * * *